United States Patent
Choi et al.

(10) Patent No.: US 8,059,255 B2
(45) Date of Patent: Nov. 15, 2011

(54) FABRICATING METHOD OF A LIQUID CRYSTAL DISPLAY DEVICE COMPRISING RUBBING DIRECTION OF ALIGNMENT FILM SUBSTANTIALLY THE SAME AS THE LIGHT ABSORPTION AXIS

(75) Inventors: Su Seok Choi, Gyeonggi-do (KR); Sang Ho Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 523 days.

(21) Appl. No.: 11/159,232

(22) Filed: Jun. 23, 2005

(65) Prior Publication Data
US 2006/0126000 A1 Jun. 15, 2006

(30) Foreign Application Priority Data
Dec. 13, 2004 (KR) .......................... 10-2004-105193

(51) Int. Cl.
C09K 19/02 (2006.01)
G02F 1/135 (2006.01)
G02F 1/1335 (2006.01)
G02F 1/141 (2006.01)

(52) U.S. Cl. ........... 349/172; 349/49; 349/100; 349/133

(58) Field of Classification Search ................... 349/172, 349/133, 49, 100
See application file for complete search history.

(56) References Cited

U.S. PATENT DOCUMENTS

| 4,850,680 | A  | * | 7/1989 | Yamazaki et al. | 349/49  |
| 6,175,401 | B1 | * | 1/2001 | Tanaka et al.   | 349/172 |
| 6,545,738 | B2 | * | 4/2003 | Park et al.     | 349/172 |
| 7,050,132 | B2 | * | 5/2006 | Okamoto et al.  | 349/114 |
| 2005/0179855 | A1 | * | 8/2005 | Helgee et al.   | 349/172 |

FOREIGN PATENT DOCUMENTS

JP 2004-133096 A 4/2004
JP 2005-284289 A 10/2005

* cited by examiner

Primary Examiner — Mark Robinson
Assistant Examiner — Charles Chang
(74) Attorney, Agent, or Firm — Morgan, Lewis & Bockius LLP

(57) ABSTRACT

A liquid crystal display device includes an upper substrate including an upper polarizer having a first light absorption axis and an upper electrode, a lower substrate including a lower polarizer having a second light absorption axis substantially parallel to the first light absorption axis and a lower electrode, a ferroelectric liquid crystal layer formed on at least one of the upper substrate and the lower substrate, and a nematic system liquid crystal layer formed on the ferroelectric liquid crystal layer between the upper substrate and the lower substrate.

8 Claims, 16 Drawing Sheets

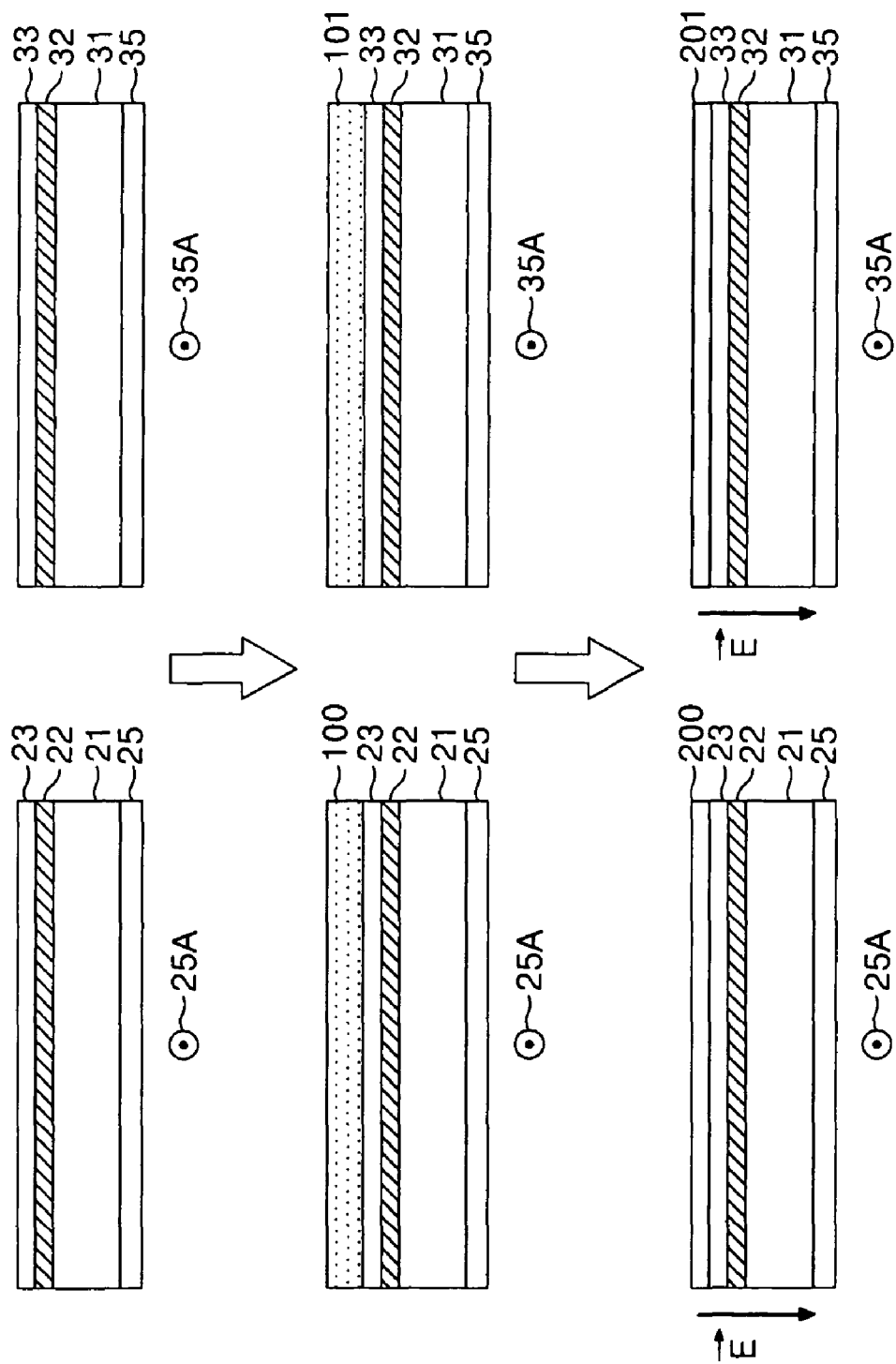

FIG.5A
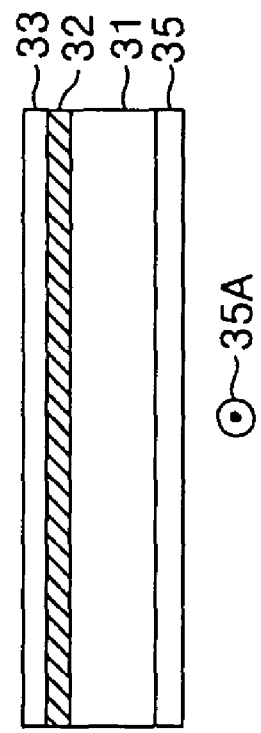
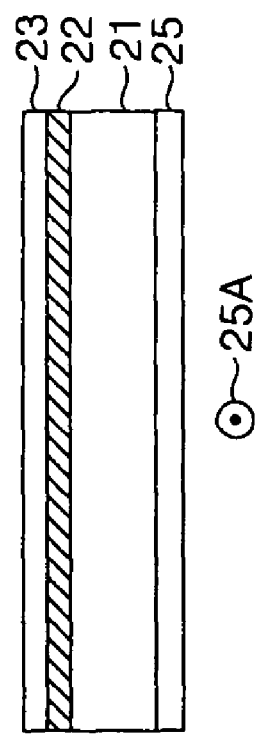

FIG. 6
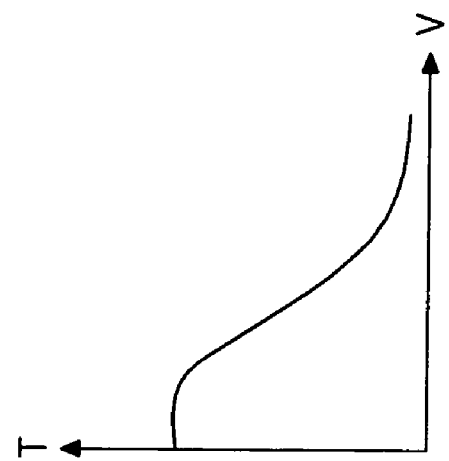
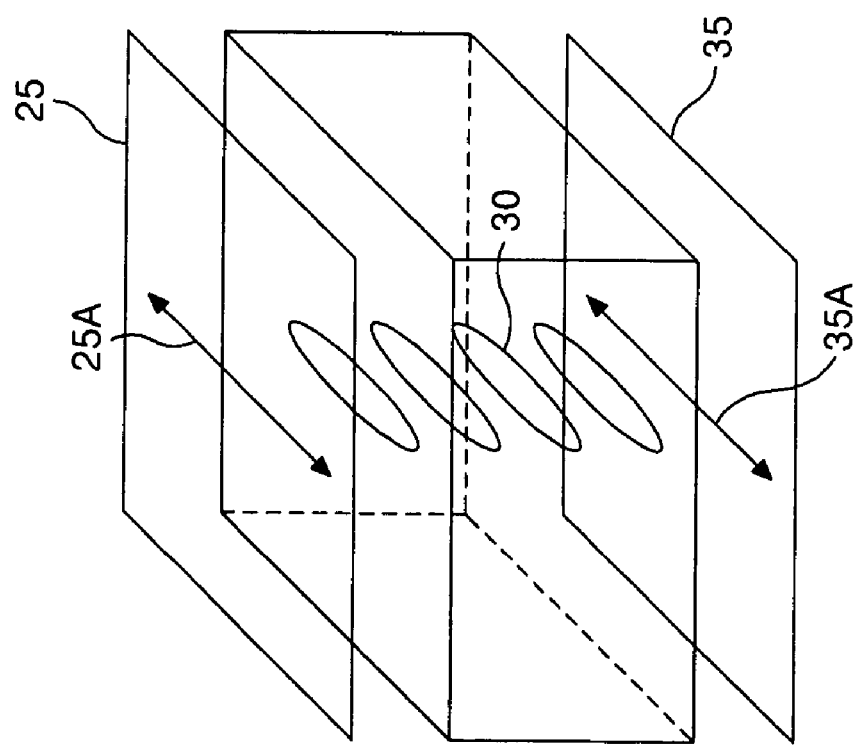

FABRICATING METHOD OF A LIQUID CRYSTAL DISPLAY DEVICE COMPRISING RUBBING DIRECTION OF ALIGNMENT FILM SUBSTANTIALLY THE SAME AS THE LIGHT ABSORPTION AXIS

The present invention claims the benefit of Korean Patent Application No. P2004-105193 filed in Korea on Dec. 13, 2004, which is hereby incorporated by reference.

BACKGROUND OF THE INVENTION

1. Field of the Invention

The present invention relates to a liquid crystal display panel, and more particularly, to a liquid crystal display panel that is adapted for increasing the viewing angle and picture quality in a diagonal direction, and a fabricating method thereof.

2. Discussion of the Related Art

A liquid crystal display modulates light that is incident to a liquid crystal cell by controlling an electric field applied to the liquid crystal cell, thereby displaying a picture. The liquid crystal display (LCD) device is generally classified into a vertical electric field type LCD and a horizontal electric field type LCD in accordance with the direction of the electric field that drive the liquid crystal.

The vertical electric field type LCD has a pixel electrode and a common electrode that are vertically positioned opposite to each other formed in an upper substrate and a lower substrate, respectively. The opposing electrodes apply an electric field to a liquid crystal cell in a vertical direction by a voltage applied to the electrodes. A twisted nematic (TN) mode is typical of the vertical electric field type LCD and is currently most widely used. Although, the twisted nematic mode has a relatively high aperture ratio, the refractive index of the liquid crystal changes dramatically depending on the viewing angle of the user. Therefore, it is difficult to obtain a wide viewing angle using a vertical electric field type LCD.

An in-plane switching (IPS) mode typical of horizontal electric field type LCDs applies an electric field between electrodes that are formed on the same substrate to drive the liquid crystal molecules. In the IPS mode, as shown in FIG. 1A, there are pixel electrodes 16 and common electrodes 15 formed on a lower glass substrate 18. An electric field 20 is formed in the horizontal direction by a voltage difference applied between the electrodes 15, 16. The liquid crystal molecules 14 are forced to rotate within the surface direction of the substrate by the horizontal electric field 20 to modulate the polarizing component of the light passing through the liquid crystal layer.

In FIG. 1B, polarizers 11 and 19 are formed on the upper glass substrate 12 and the lower glass substrate 18. When looking from the front (i.e., front observation), polarized light absorption axes, or transmission axes 11A,19A in the polarizers 11,19 are perpendicular to each other. The alignment films 13 and 17 are formed on the upper glass substrate 12 and the lower glass substrate 18, respectively. Generally, the alignment films are formed of polyimide and treated to be aligned by rubbing, for example.

In the IPS mode, light transmitted through the liquid crystal layer passes through the upper polarizer 11 if the linear polarized light is changed by the liquid crystal layer. If the polarizing component of the light that passes through the liquid crystal layer is not changed, then the light does not pass through the upper polarizer 11.

In the IPS mode, the electric field generated between pixel electrode 16 and common electrode 15 to be applied to the liquid crystal molecules 14 is bent such that the light switching is not normal to the electrodes 15 and 16. The result is a low aperture ratio in the IPS mode. Further, when an IPS mode LCD device is viewed in a diagonal direction, as shown in FIG. 2 (i.e., oblique observation), the angle of the polarized light absorption axis 11A of the upper polarizer 11 and the polarized light absorption axis 19A of the lower polarizer 19 appears to be greater than 90°. As a result, light leaks out from a black screen because light is not fully polarized. Consequently, contrast is reduced in the diagonal direction. Deterioration of contrast in the diagonal direction can be seen in FIG. 3, which shows an experimental result of the viewing angle characteristics of the in-plane switching mode. As shown in FIG. 3, there is almost no light leakage during front observation, i.e., when the observer is at right angles with the screen (blue). However, light leakage occurs in the diagonal direction when the angle between the polarized light absorption axes 11A and 19A is greater than 90° (baby blue, green, yellow, red).

SUMMARY OF THE INVENTION

Accordingly, the present invention is directed to a liquid crystal display that substantially obvious one or more problems due to limitations and disadvantages of the related art.

An object of the present invention to provide a liquid crystal display panel with increased viewing angle and improved picture quality when viewed in a diagonal direction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the purpose of the present invention, as embodied and broadly described, a liquid crystal display device includes an upper substrate including an upper polarizer having a first light absorption axis and an upper electrode, a lower substrate including a lower polarizer having a second light absorption axis substantially parallel to the first light absorption axis and a lower electrode, a ferroelectric liquid crystal layer formed on at least one of the upper substrate and the lower substrate, and a nematic system liquid crystal layer formed on the ferroelectric liquid crystal layer between the upper substrate and the lower substrate.

In another aspect, a fabricating method of a liquid crystal display device includes the steps of forming an upper polarizer having a first light absorption axis on an upper substrate, forming a lower polarizer having a second light absorption axis on a lower substrate, the second light absorption axis being substantially parallel to the first light absorption axis, forming an electrode on each of the upper substrate and the lower substrate, forming a ferroelectric liquid crystal on at least one of the upper substrate and the lower substrate, and forming a nematic system liquid crystal layer on the ferroelectric liquid crystal layer between the upper substrate and the lower substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 are sectional views showing various stages of fabrication for an exemplary liquid crystal display device according to a first exemplary embodiment of the present invention;

FIGS. 5A to 5D are sectional views showing various stages of fabrication for an exemplary liquid crystal display device according to a second exemplary embodiment of the present invention;

FIG. 6 is a diagram showing a normally white mode (i.e., white state) in a liquid crystal display device according to an exemplary embodiment of the present invention;

DETAILED DESCRIPTION OF THE PREFERRED EMBODIMENTS

Figure 1A:
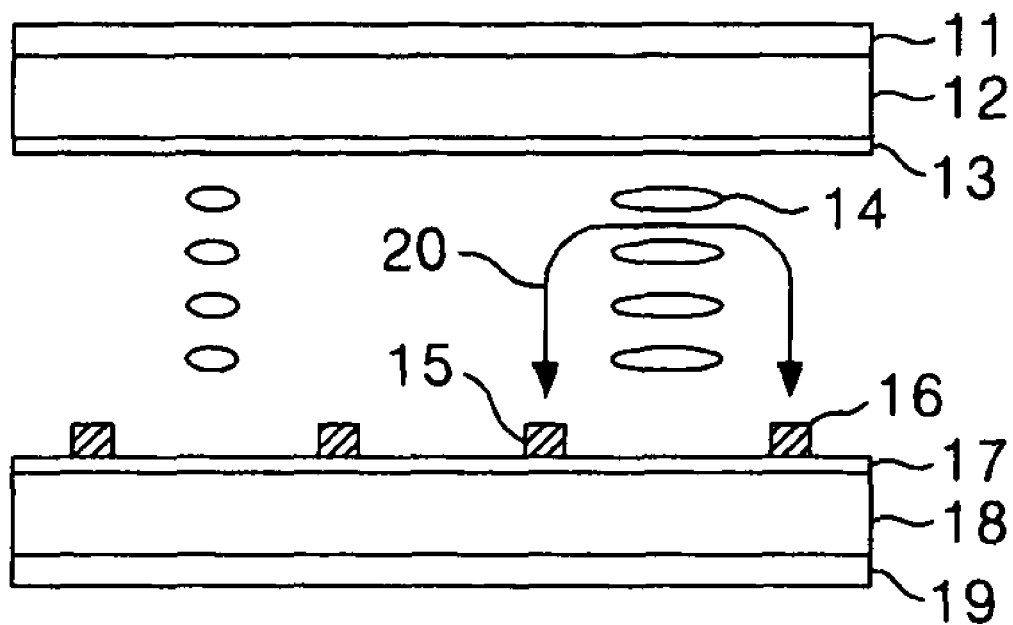
FIG. 1A is a sectional view showing the operation of an in-plane switching (IPS) mode liquid crystal display device (LCD) of the related art.
Figure 1B:
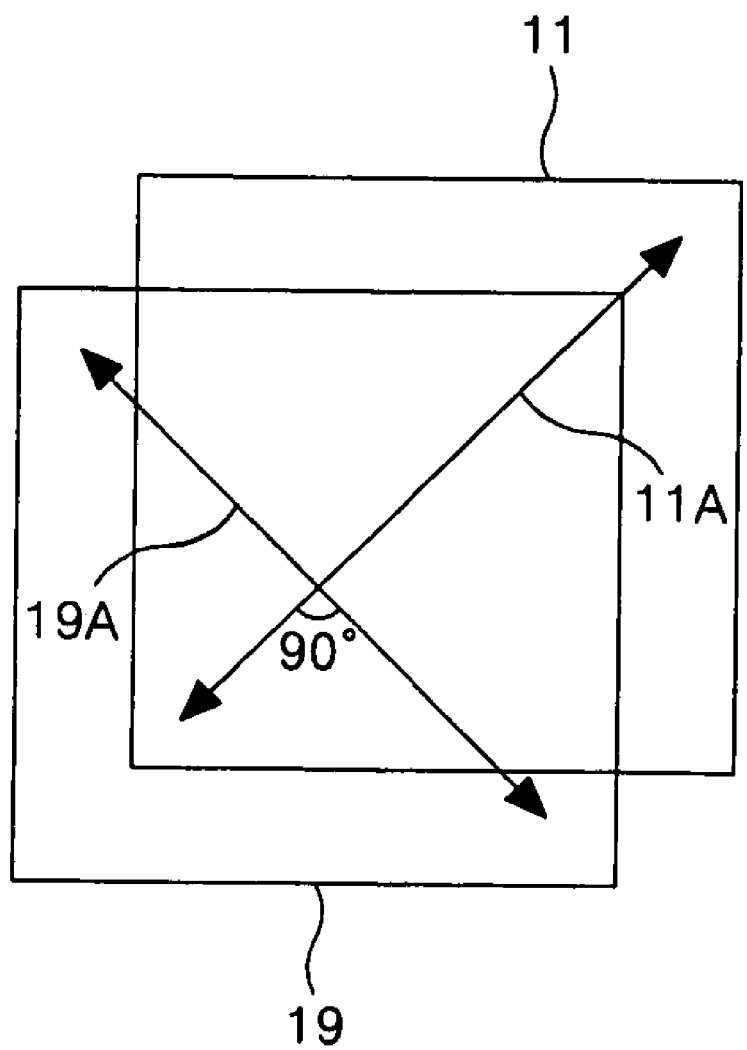
FIG. 1B is a diagram showing the polarized light absorption axes of the polarizers in IPS mode LCD of the related art.
Figure 2:
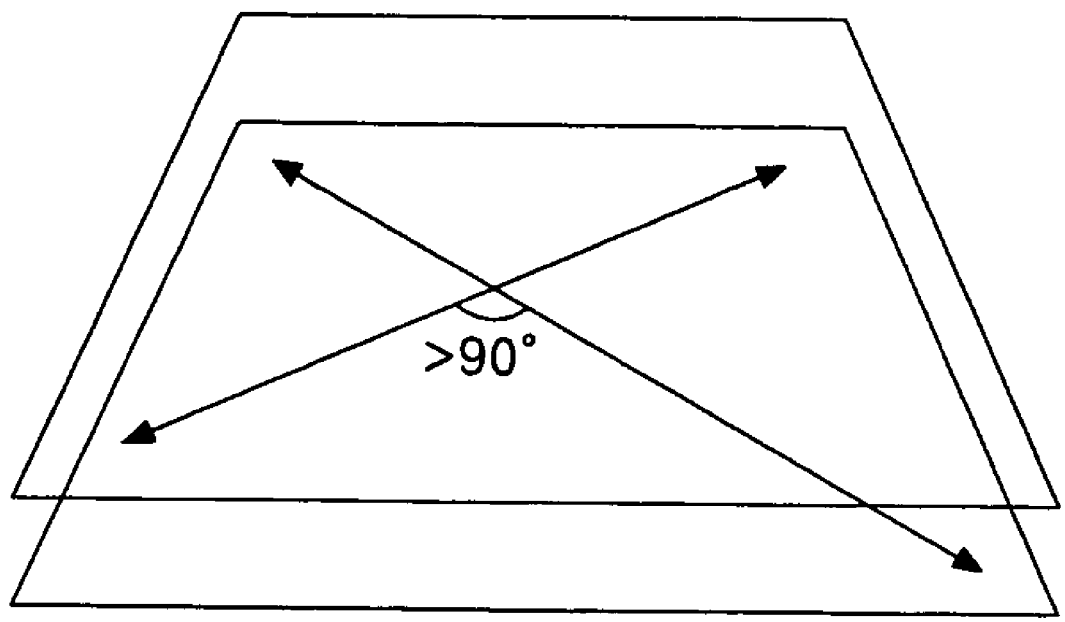
FIG. 2 is a diagram showing an angle of light absorption axis of an upper polarizer and a lower polarizer in an in-plane switching mode liquid crystal display device when viewed in a diagonal direction.
Figure 3:
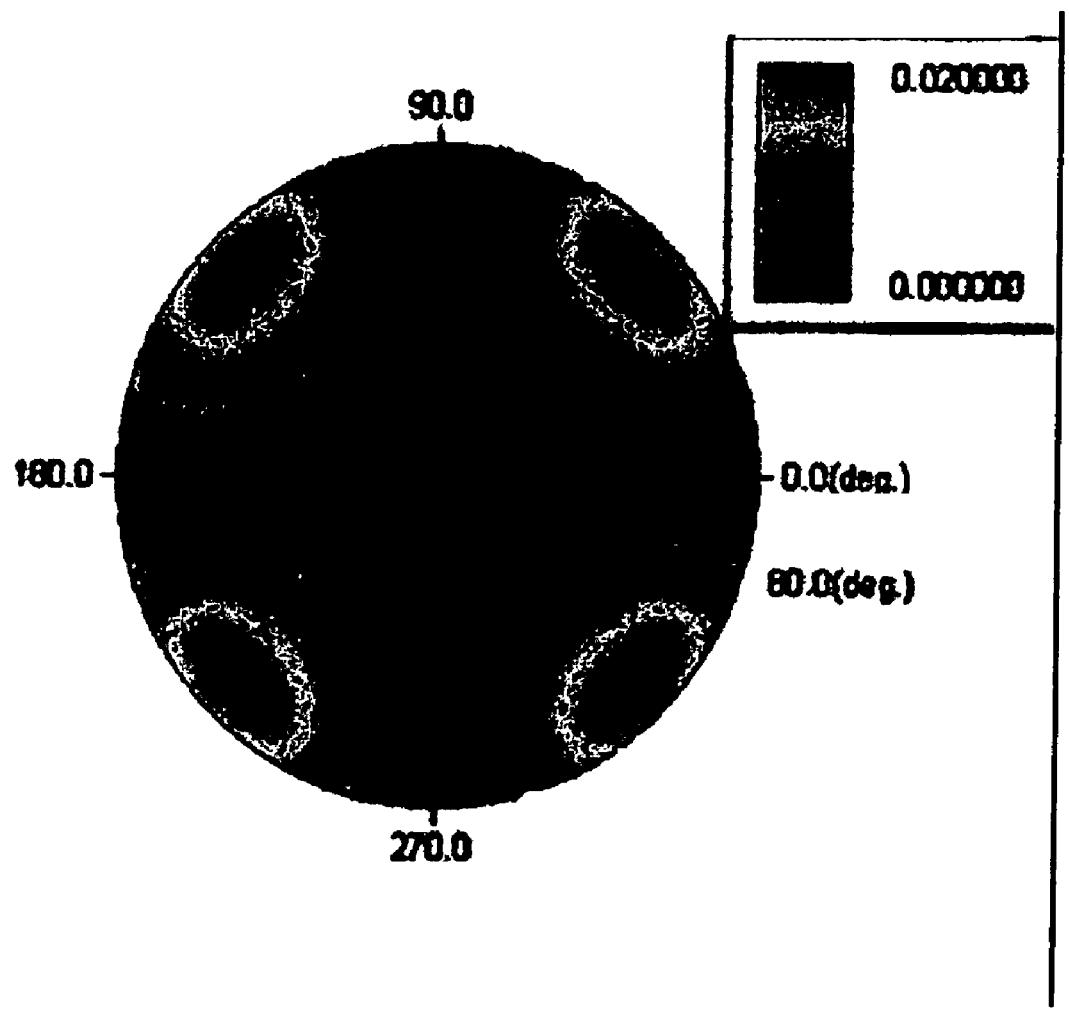
FIG. 3 is a diagram showing experimental results of light leakage in a diagonal direction of an in-plane switching mode liquid crystal display device.

Reference will now be made in detail to the preferred embodiments of the present invention, examples of which are illustrated in the accompanying drawings. Hereinafter, the preferred embodiments of the present invention will be described in detail with reference to FIGS. 4 to 12.

FIG. 4 represents a fabricating method of a liquid crystal display device according to a first exemplary embodiment of the present invention. As illustrated in FIG. 4, electrodes 22, 32 and alignment films 23, 33 are formed on an upper glass substrate 21 and a lower glass substrate 31, respectively. The upper electrode 22 and the lower electrode 32 are formed of a transparent conductive material such as indium tin oxide (ITO). The alignment films 23, 33 are formed of an organic material, such as polyimide, and are treated by rubbing to set a pre-tilt angle of ferroelectric liquid crystal molecules as described below.

A polarizer 35 having polarized light absorption axis 35A is attached to a light incidence surface of the lower glass substrate 31. Likewise, a polarizer 25 having polarized light absorption axis 25A is attached to a light exit surface of the upper glass substrate 21. The upper polarized light absorption axis 25A is arranged to be parallel to the lower polarized light absorption axis 35A.

Liquid crystal solution layers 100, 101 are formed over the alignment films 23, 33 with a uniform thickness. The solution layers 100, 101 are made from a mixture of ferroelectric liquid crystals and a benzene system solvent based on a composition ratio shown in TABLE 1.

TABLE 1

| Ordinary ferroelectric liquid crystal | 93 wt %~97 wt % |
| Benzene system solvent | 3 wt %~7 wt % |

Subsequently, heat is applied to the substrate 25 and 35 at a temperature that vaporizes the solvent. As the temperature decreases from a transition temperature Tni to a transition temperature Tsn to a transition temperature Tcs, a thermodynamic phase transition in the ferroelectric liquid crystal occurs in the following sequence:

(Tni): isotropic phase→chiral nematic phase N*;
(Tsn): chiral nematic phase N*→chiral smectic phase SmC*;
(Tcs): chiral smectic phase SmC*→crystal phase.

Once the solvent is vaporized the mixture is either exposed to a medium with high electronegativity, or subjected to an electric field or a magnetic field during the induced phase transition from the chiral nematic phase N* to the smectic phase SmC*. Exposure to polarized energy aligns the ferroelectric liquid crystals in ferroelectric liquid crystal layers 200, 201 to a desired spontaneous polarization direction. Exemplary techniques of exposing the mixture to a medium with high polarity include placing the ferroelectric liquid crystal layers 200, 201 under water $H_2O$ or exposing these layers to oxygen $O_2$. By exposing the ferroelectric liquid crystal layers 200, 201 to a medium with an electrical polarity, or by applying an electric or magnetic field to the mixture, the spontaneous polarization directions (Ps) of the ferroelectric liquid crystal layers 200, 201 are set either toward or away from their respective substrates 21, 31.

After the spontaneous polarization direction Ps has been set, the upper glass substrate 21 and the lower glass substrate 31 are bonded together with a sealant (not shown). The sealant defines a designated cell gap between the upper glass substrate 21 and the lower glass substrate 31, and a nematic system liquid crystal material is injected into the inner space created by the gap. Due to phase separation, the ferroelectric liquid crystal layers 200, 201 do not mix with the nematic system liquid crystal molecules as to form an interface between the ferroelectric liquid crystal layers 200, 201 with the nematic system liquid crystal molecules. The nematic system liquid crystal molecules can be positive-type or negative-type liquid crystals.

Figure 7:
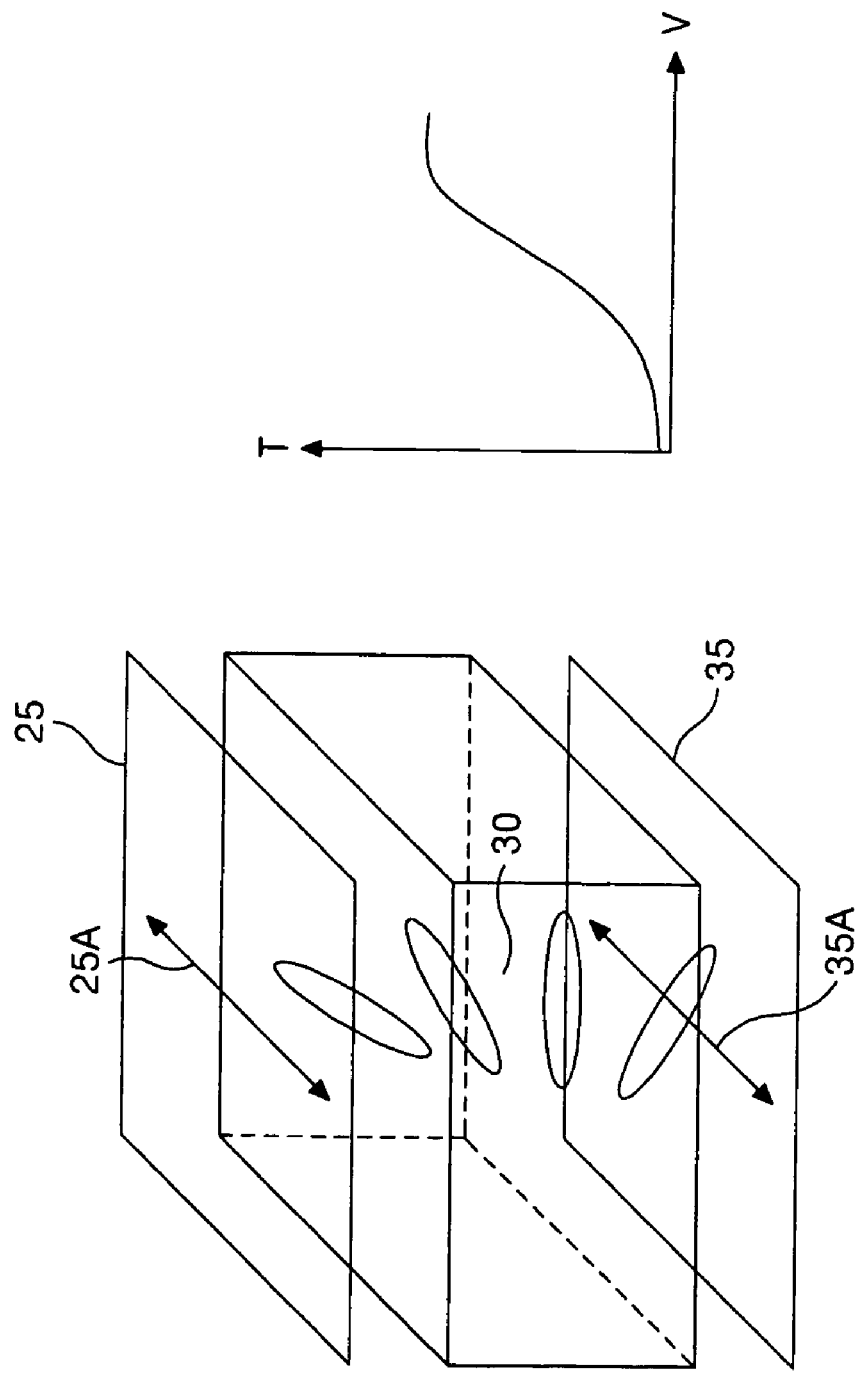
FIG. 7 is a diagram showing normally black mode (i.e., black state) in a liquid crystal display device according to an exemplary embodiment of the present invention.

As shown in FIG. 6, if the rubbing directions of the upper alignment film 23 and the lower alignment film 33 are the same as the polarized light absorption axes 25A, 35A, the liquid crystal display device is in a normally white mode (i.e., white state) such that transmissivity T decreases as an external applied voltage V increases. If any one of the rubbing directions of the upper alignment film 23 and the lower alignment film 33 is at right angles to the polarized light absorption axes 25A, 35A, the liquid crystal display device is in a normally black mode (i.e., black state) such that transmissivity T increases as an external applied voltage V increases, as shown in FIG. 7

Figure 5B:
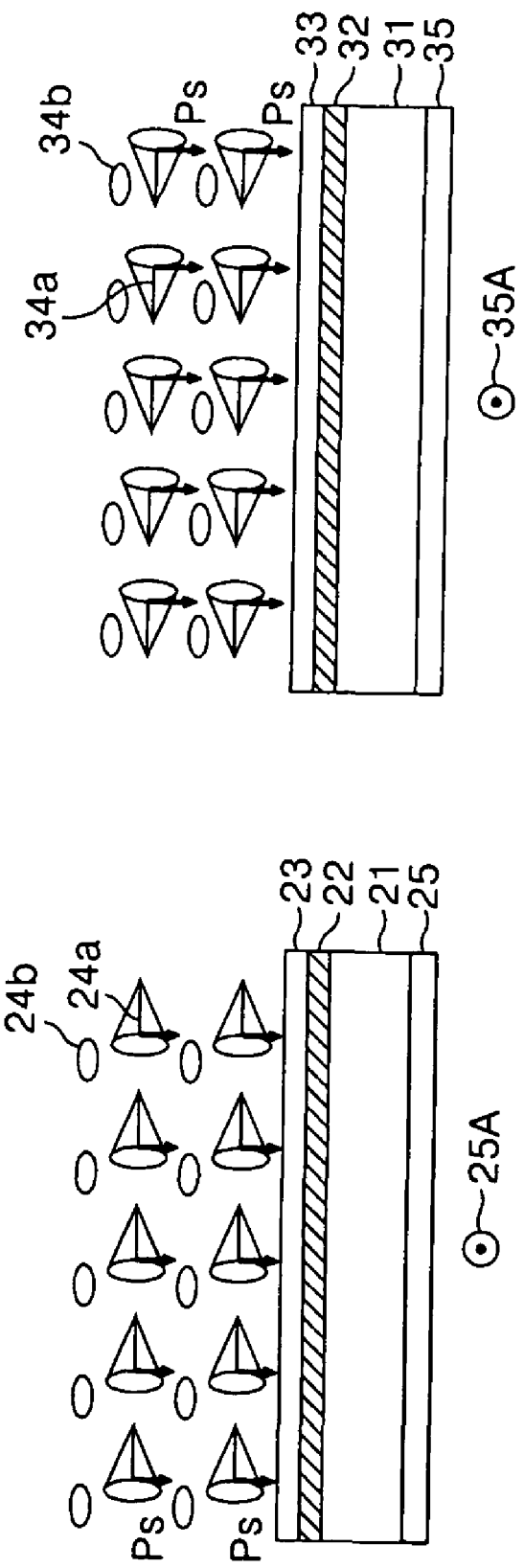

FIGS. 5A to 5D illustrate various stages of fabrication for a liquid crystal display device according to a second exemplary embodiment of the present invention. As shown in FIG. 5A, electrodes 22, 32 and alignment films 23, 33 are formed on the upper glass substrate 21 and the lower glass substrate 31, respectively. The upper electrode 22 and the lower electrode 32 are formed of a transparent conductive material such as indium tin oxide (ITO). The alignment films 23, 33 are formed of an organic material, such as polyimide, and are treated by rubbing in order to set the pre-tilt angle of the ferroelectric liquid crystal molecules as described below. The polarizer 35 having polarized light absorption axis 35A is attached onto the light incidence surface of the lower glass substrate 31. Likewise, the polarizer 25 having polarized light absorption axis 25A is attached onto the light exit surface of the upper glass substrate 21. The upper polarized light absorption axis 25A is arranged to be parallel to the lower polarized light absorption axis 35A.

Subsequently, a very small amount of photopolymerization monomer is added to ferroelectric liquid crystals based on a composition ratio shown in TABLE 2.

TABLE 2

| Ferroelectric liquid crystal | 95 wt %~99 wt % |
|---|---|
| Photopolymerization monomer | 1 wt %~5 wt % |

The ferroelectric liquid crystals and the photopolymerization monomer are mixed to be uniform, and then the mixture is spread over the alignment films 23, 33 with a uniform thickness. The ferroelectric liquid crystals can be of any known ferroelectric liquid crystal material, and the photopolymerization monomer can be of any known nematic system monomer.

As the temperature decreases from a transition temperature Tni to a transition temperature Tsn to a transition temperature (Tcs), a thermodynamic phase transition in the ferroelectric liquid crystals 24, 34 occurs in the following sequence:

(Tni): isotropic phase→chiral nematic phase N*;
(Tsn): chiral nematic phase N*→chiral smectic phase SmC*;
(Tcs): chiral smectic phase SmC*→crystal phase.

The mixture is then either exposed to a medium with high electronegativity, or subjected to an electric field or a magnetic field during the induced phase transition from the chiral nematic phase N* to the smectic phase SmC*. Exposure to polarized energy aligns the ferroelectric liquid crystals in ferroelectric liquid crystals 24a, 34a to a desired spontaneous polarization direction indicated by arrows in FIG. 5B. Exemplary techniques of exposing the mixture to a medium with high polarity include placing the ferroelectric liquid crystal layers 200, 201 under water $H_2O$ or exposing these layers to oxygen $O_2$. By exposing the ferroelectric liquid crystal layers 200, 201 to a medium with an electrical polarity, or by applying an electric or magnetic field to the mixture, the spontaneous polarization directions (Ps) of the ferroelectric liquid crystals 24a, 34a are set either toward or away from their respective substrates 21, 31.

Figure 5C:
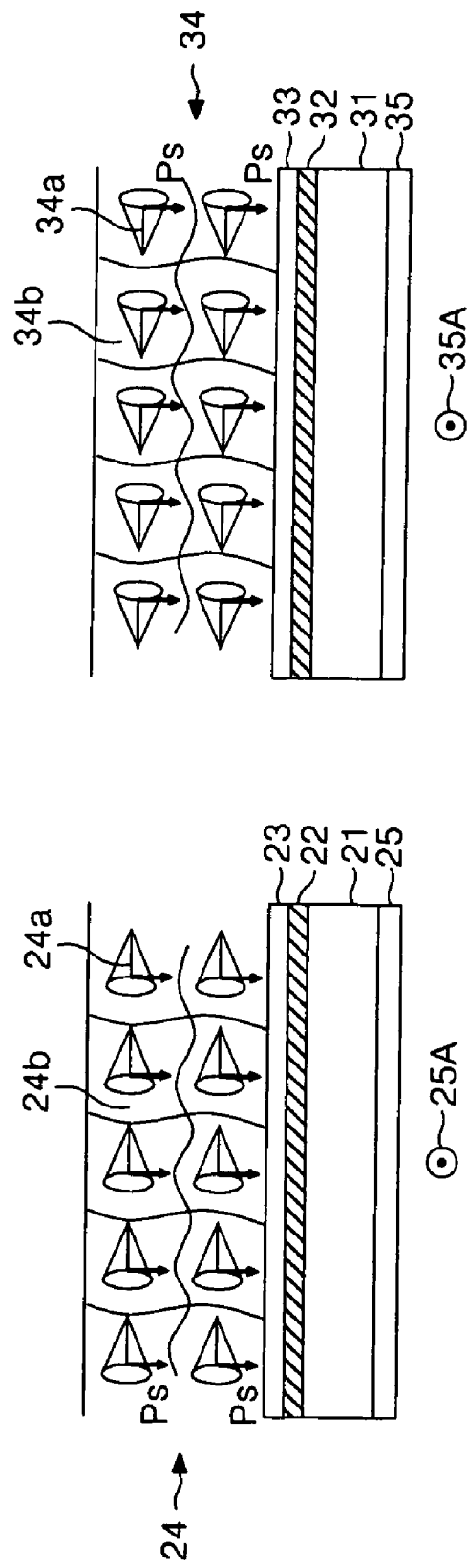

Subsequently, ultraviolet (UV) ray is irradiated on the mixture to induce photopolymerization of the mixture of TABLE 2. As shown in FIG. 5C, the UV exposure process links the ferroelectric liquid crystals 24a, 34a as the photopolymerization monomers 24b, 34b are polymerized, thereby forming ferroelectric liquid crystal layers 24, 34. As a result, the spontaneous polarization direction is established uniformly throughout the ferroelectric liquid crystal layers 24, 34, thereby stabilizing the initial alignment. By the foregoing description, a polymer stabilized ferroelectric liquid crystal (PSFLC) active alignment films 24, 34 are formed on the substrates 21, 31 to stabilize the alignment state. Because only a very small amount of photopolymerization monomer is added, the cross-linking of the ferroelectric liquid crystals 24a, 34a is does not prevent the ferroelectric liquid crystals 24a, 34a from rotating when an external electric field is applied.

Figure 5D:
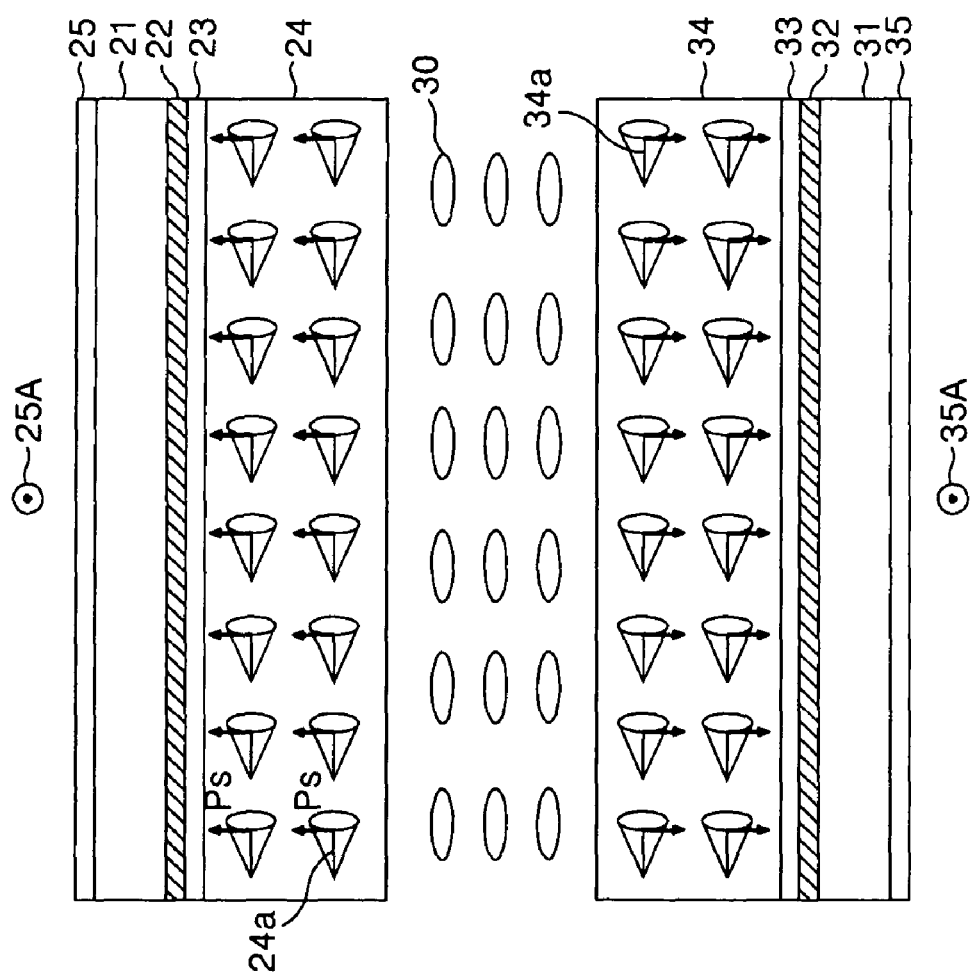

Thereafter, the upper glass substrate 21 and the lower glass substrate 31 are bonded together with a sealant (not shown) that defines a designated cell gap between substrates 21, 31. Nematic liquid crystals 30 are rejected into an inner space thereof, as shown in FIG. 5D. The ferroelectric liquid crystals 24a, 34a in ferroelectric liquid crystal layers 24, 34 do not mix with the nematic liquid crystal molecules 30 due to phase separation. Therefore, an interactive interface is formed between the ferroelectric liquid crystal layers 24, 34 and the nematic liquid crystal molecules 30. The nematic liquid crystal molecules 30 can be positive-type of negative-type liquid crystals.

As shown in FIG. 6, if the rubbing directions of the upper alignment film 23 and the lower alignment film 33 are the same as the polarized light absorption axes 25A, 35A, the liquid crystal display device is in a normally white mode (i.e., white state) such that transmissivity T decreases as an external applied voltage V increases. If any one of the rubbing directions of the upper alignment film 23 and the lower alignment film 33 is made to be in a direction of being at right angles to the polarized light absorption axes 25A, 35A, the liquid crystal display device is in a normally black mode (i.e., black state) such that transmissivity T increases as an external applied voltage V increases, as shown in FIG. 7.

Figure 8:
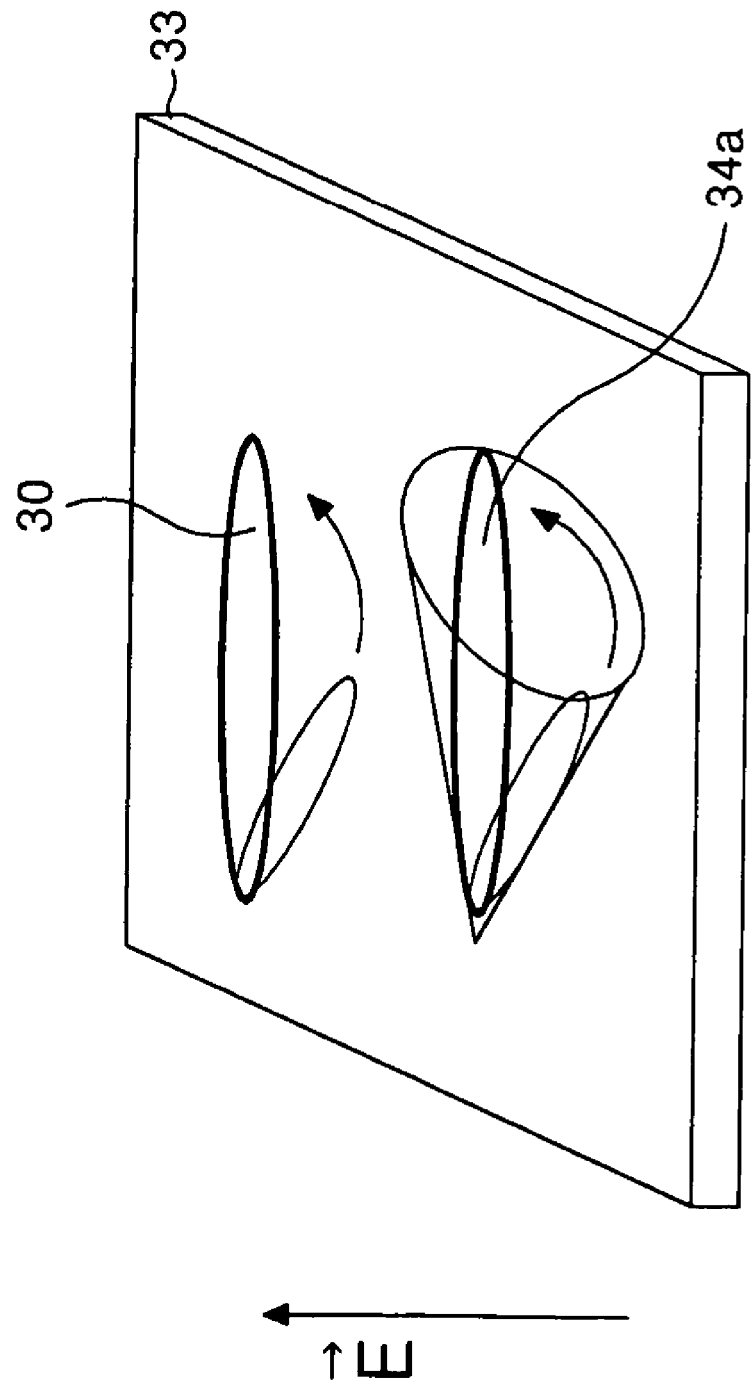
FIG. 8 is a perspective view showing a drive mechanism of a ferroelectric liquid crystal and a nematic liquid crystal in an exemplary liquid crystal display device according to an exemplary embodiment of the present invention.
Figure 9:
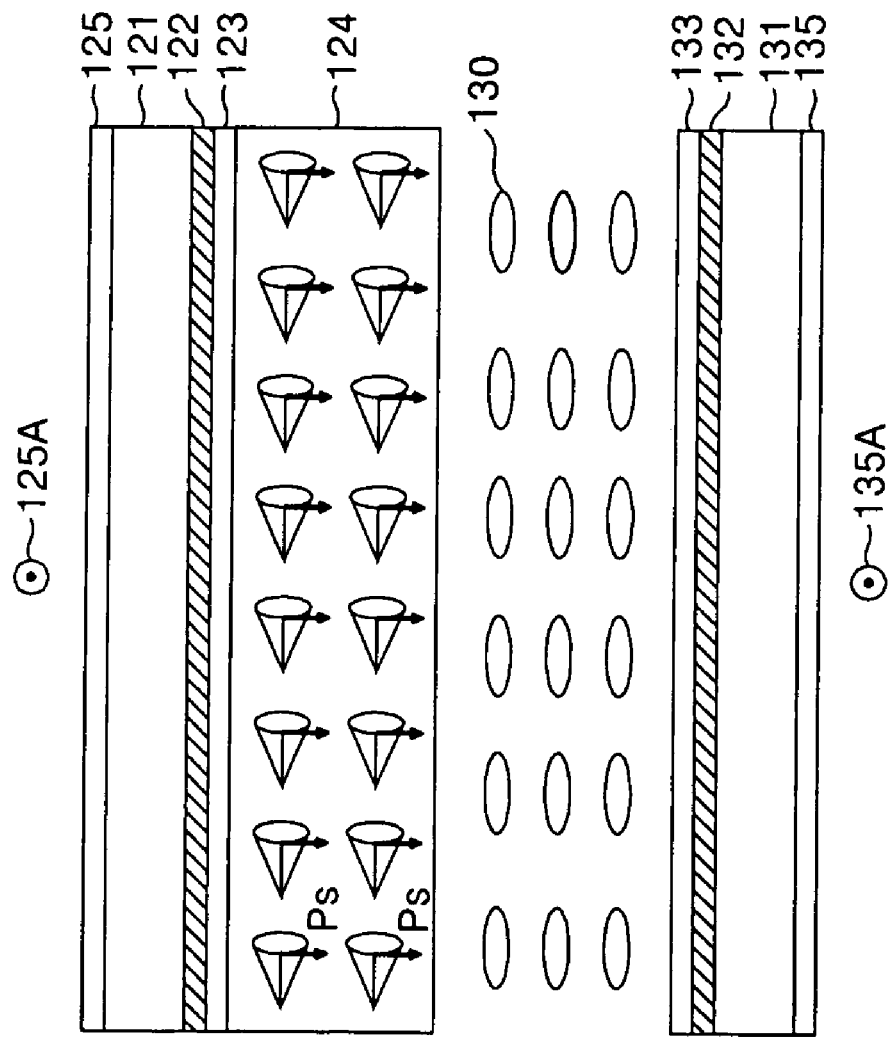
FIGS. 9 to 12 are sectional views showing an exemplary liquid crystal display device according to other exemplary embodiments of the present invention.
Figure 10:
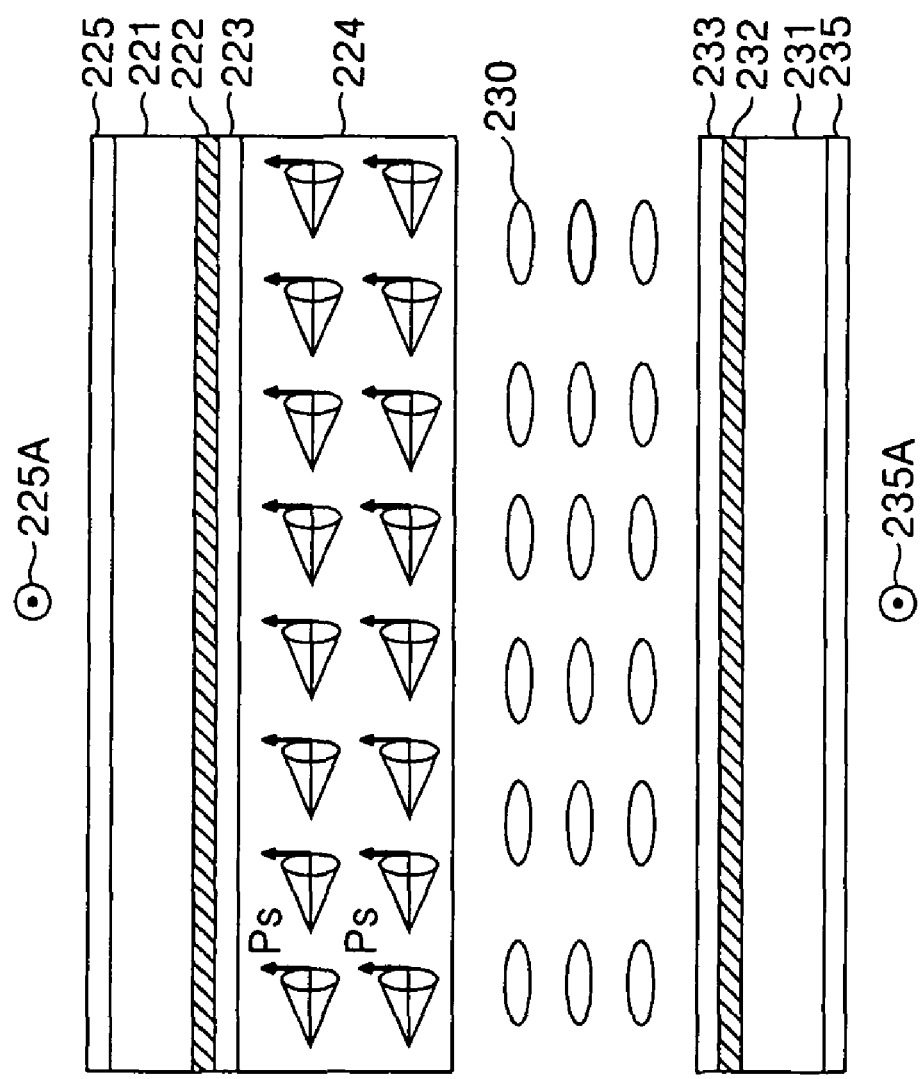
Figure 11:
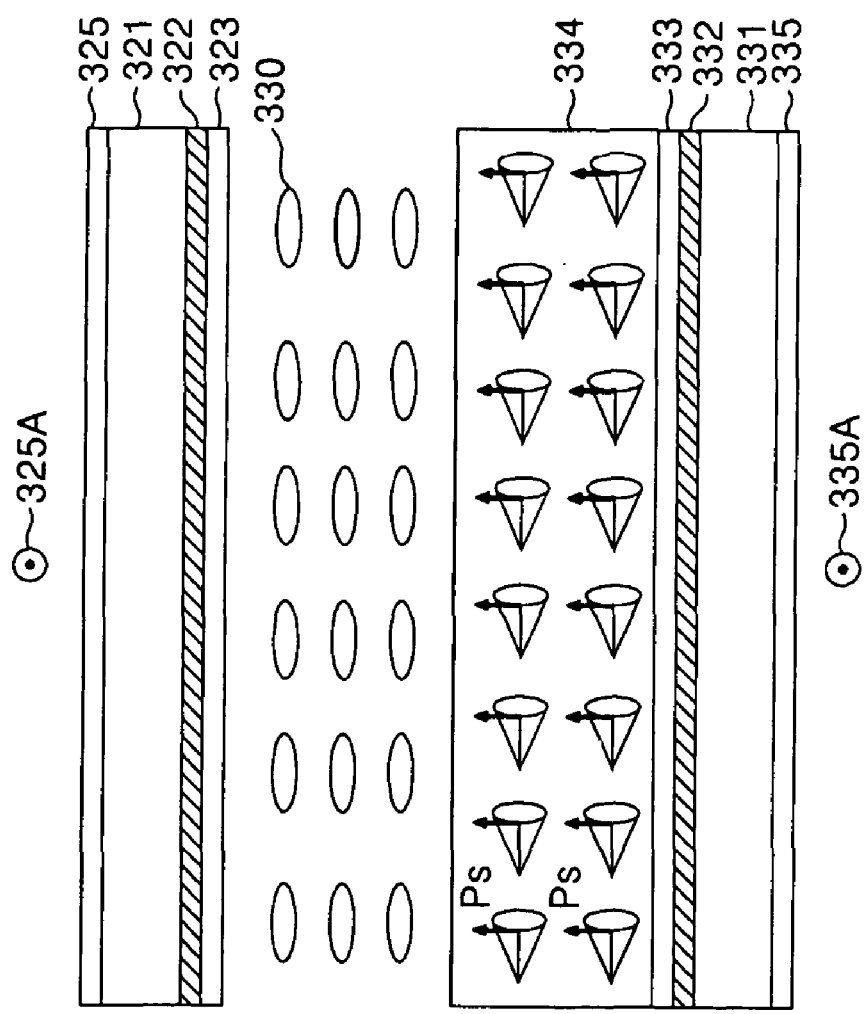
Figure 12:
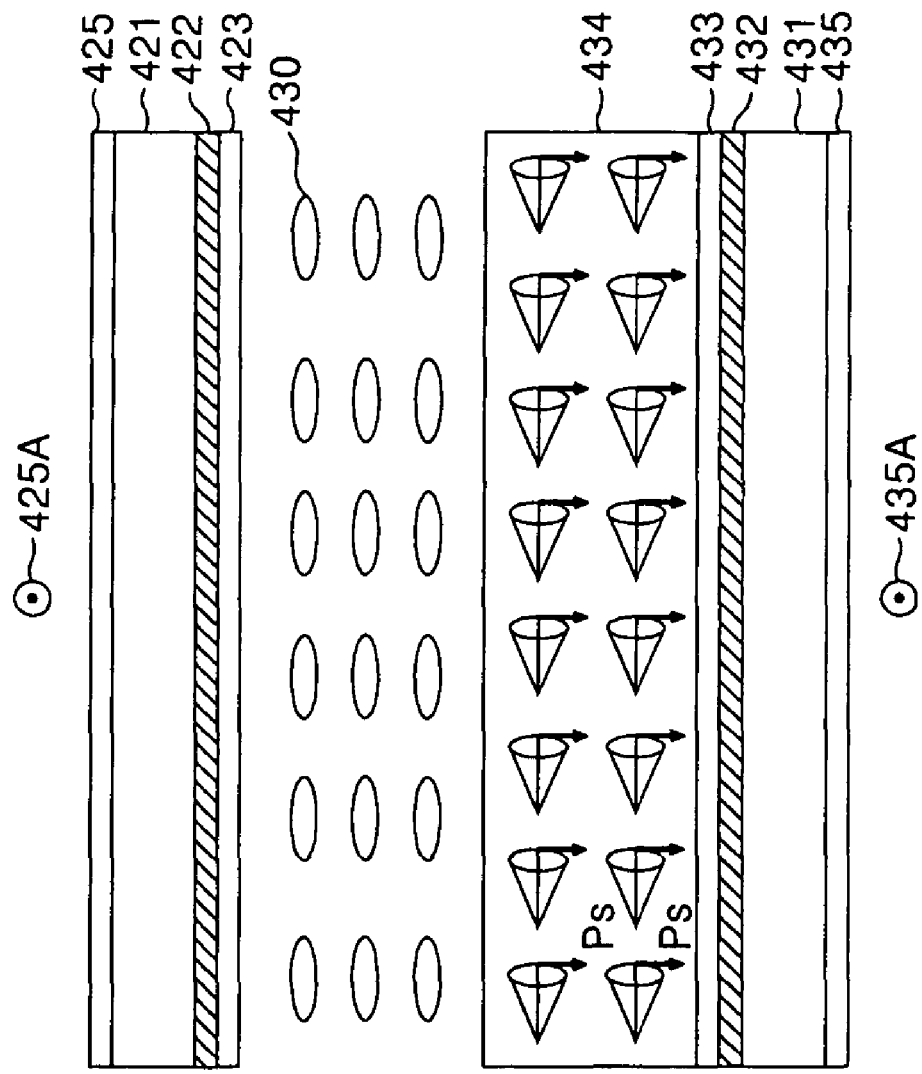

FIG. 8 explains the drive mechanism of the liquid crystal display device of the exemplary embodiments of the present invention. If an electric field (E) of opposite direction is applied to the spontaneous polarization Ps of the ferroelectric liquid crystal layer 34 on lower alignment film 33, for example, the ferroelectric liquid crystal 34a rotates along a virtual cone as shown. The ferroelectric liquid crystal 34a is substantially driven horizontally (i.e., in-plane) and therefore drives the nematic system liquid crystal molecule 30 adjacent thereto. Since the ferroelectric liquid crystal 34a of the lower plate 33 has a permanent polarization, i.e., spontaneous polarization Ps, it rapidly rotates due to an interaction of the electric field (E) and the spontaneous polarization Ps, similar to the interaction of magnets. On the other hand, the ferroelectric liquid crystal 24a of the upper alignment film 23 (FIG. 5D) does not rotate because the direction of its spontaneous polarization Ps is the same as the direction of the electric field (E). Accordingly, the white state (FIG. 6) is changed to the black state (FIG. 7), thereby controlling the amount of transmitted light.

The white state is obtained when the major axes of each of the ferroelectric liquid crystals 24a, 34a in the upper/lower ferroelectric liquid crystal layers 24, 34 are parallel to the polarized line absorption axes 25A, 35A of the upper/lower polarizers 25, 35, allowing light to pass through the polarized light absorption axis 35A of the lower polarizer 35, the nematic liquid crystals 30, and the polarized light absorption axis 25A of the upper polarizer 25. The black state is obtained when the major axes of the ferroelectric liquid crystals 34a in the lower ferroelectric liquid crystal layer 34 are at 90° with the polarized light absorption axis 25A of the lower plate polarizer 25 such that the light incident to the nematic system liquid crystal layer 30 is intercepted. The amount of light transmitted is controlled when the polarity of the electric field (E) is inverted by an alternating current (AC) drive applied to the electrodes 22, 32. Because the ferroelectric liquid crystals 34a on the lower substrate 31 are fixed in the same direction as the inverted electric field (E), the ferroelectric liquid crystals 24a on the upper substrate 21 are substantially driven in-plane to re-establishing a white state, thereby controlling the amount of transmitted light.

The in-plane driven characteristics of the nematic system liquid crystals 30 according to the exemplary embodiments of the present invention provide a wide viewing angle similar to related art IPS mode LCD. At the same time, because the electrodes 22, 32 are vertically opposite to each other, a vertical electric field is applied to the nematic liquid crystals 30, thereby increasing the aperture ratio compared to the related art IPS mode LCDs. Further, the nematic system liquid crystals 30 are rapidly rotated by the ferroelectric liquid crystals 24a, 34a, thus improving the response time. Additionally, since the polarized light absorption axes 25A, 35A of the upper/lower polarizers 25, 35 are in parallel, no light leakage occurs in the diagonal direction, thus improving the contrast characteristics of the LCD device.

The drive mechanism explained above in relation to the exemplary embodiments of the present invention remains substantially the same even if the spontaneous polarization of the upper plate ferroelectric liquid crystal layer 24 and the spontaneous polarization of the lower ferroelectric liquid crystal layer 34 are inverted. This is because only one ferroelectric active alignment film is driven in response to a given polarity of an electric field as explained above. Accordingly, the drive mechanism of the foregoing exemplary embodiments remains substantially the same even if the ferroelectric active alignment film is formed on any one of the upper plate and the lower plate. FIGS. 9 to 12 illustrate further exemplary embodiments that have the ferroelectric active alignment film formed on only one substrate.

As illustrated in FIGS. 9 to 12, the liquid crystal display device according to the exemplary embodiments of the present invention includes an electrode (122, 222, 322, 422) and an alignment film (123, 223, 323, 423) formed on an upper glass substrate (121, 221, 321, 421), and an electrode (132, 232, 332, 432) and an alignment film (133, 233, 333, 433) formed on a lower glass substrate (131, 231, 331, 431). A ferroelectric liquid crystal layer (124, 224, 334, 434) is formed on an alignment film (123, 223, 333, 433) of any one of the upper glass substrate (121, 221) and the lower glass substrate (331, 431). A nematic system liquid crystal layer (130, 230, 330, 430) is driven in-plane in conjunction with the ferroelectric liquid crystal layer (124, 224, 334, 434).

A polarizer (135, 235,335, 435) having a polarized light absorption axis (135A, 235A, 335A, 435A) is attached onto the light incidence surface of the lower glass substrate (131, 231, 331, 431). Further, a polarizer (125, 225,325, 425) having a polarized light absorption axis (125A, 225A, 325A, 425A) is attached onto the light exit surface of the upper glass substrate (121, 221, 321, 421). The upper polarized light absorption axis (125A, 225A, 325A, 425A) is substantially parallel to the lower polarized light absorption axis (135A, 235A, 335A, 435A).

The ferroelectric liquid crystals of ferroelectric liquid crystal layer (124, 224, 334, 434) are phase-transitioned into ferroelectric liquid crystals of a half "V" switching mode. The ferroelectric liquid crystal layer (124, 224, 334, 434) is exposed to a polar medium or an electric or magnetic field to fixedly align the direction of its spontaneous polarization to any one of the upper substrate (221), the lower substrate (431), and the nematic liquid crystal layer (130, 330). The ferroelectric liquid crystal layer (124, 224, 334, 434) is driven in response to an electric field opposite in direction to its spontaneous polarization direction, thereby driving in-plane the liquid crystal molecules of the nematic system liquid crystal layer (130, 230, 330, 430).

As described above, the LCD device according to the exemplary embodiments having one ferroelectric liquid crystal layer form on either the upper and lower substrates enjoys the same advantages as the LCD device according to the exemplary embodiments having the ferroelectric liquid crystal layers formed on both the upper and lower substrates. That is to say, the aperture ratio of the LCD devices according to the exemplary embodiments of the present invention is higher than the related art IPS mode LCD devices. Wide viewing angle is obtained due to the polymer stabilized ferroelectric liquid crystal (PSFLC) active alignment film, which drives the nematic system liquid crystals in-plane. The response time of the nematic system liquid crystals is improved because the nematic system liquid crystals are rapidly rotated by the ferroelectric liquid crystal layer. The contrast characteristics in the diagonal direction are improved because the polarized light absorption axes of the upper/lower plate polarizers are in parallel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A fabricating method of a liquid crystal display device, comprising the steps of:

forming an upper polarizer having a first light absorption axis on an upper substrate;

forming a lower polarizer having a second light absorption axis on a lower substrate, the second light absorption axis being substantially parallel to the first light absorption axis;

forming an electrode on each of the upper substrate and the lower substrate;

forming an upper alignment film on the upper substrate;

forming a lower alignment film on the lower substrate;

forming a ferroelectric liquid crystal layer on at least one of the upper alignment film and the lower alignment film; and forming a nematic system liquid crystal layer on the ferroelectric liquid crystal layer, wherein the light absorption axes of the polarizers are substantially in parallel each other when the liquid crystal display device is viewed in a diagonal direction, wherein a first rubbing direction of the upper alignment film and a second rubbing direction of the lower alignment film are substantially the same as the first and second light absorption axes, wherein the liquid crystal display device drives in a normally white mode such that a transmissivity decreases as an external voltage to be applied to at least one of the electrodes increases, wherein the step of forming the ferroelectric liquid crystal layer includes the steps of:

forming a ferroelectric liquid crystal solution by mixing a ferroelectric liquid crystal into a solvent, wherein the solution includes between about 93 wt % and 97 wt % of the ferroelectric liquid crystal and between about 3 wt % and 7 wt % of the solvent;

spreading the solution over at least one of the upper substrate and the lower substrate;

evaporating the solvent within the solution by heating the substrate; and aligning a spontaneous polarization direction of the ferroelectric liquid crystal using any one of a step of exposing the ferroelectric liquid crystal to a medium having high or low polarity, and applying a magnetic field to the ferroelectric liquid crystal.

2. The fabricating method according to claim 1, wherein the step of forming the ferroelectric liquid crystal layer includes the steps of:
- forming a ferroelectric liquid crystal solution by mixing a ferroelectric liquid crystal with a photopolymerization monomer;
- spreading the solution over at least one of the upper substrate and the lower substrate;
- aligning a spontaneous polarization direction of the ferroelectric liquid crystal; and
- polymerizing the photopolymerization monomer by irradiating the solution with ultraviolet ray.

3. The fabricating method according to claim 2, wherein the solution includes between about 95 wt % and 99 wt % of the ferroelectric liquid crystal and between about 1 wt % and 5 wt % of the photopolymerization monomer.

4. The fabricating method according to claim 2, wherein the step of aligning the spontaneous polarization direction of the ferroelectric liquid crystal includes any one of a step of exposing the ferroelectric liquid crystal to a medium having high or low polarity, applying an electric field to the ferroelectric liquid crystal, and applying a magnetic field to the ferroelectric liquid crystal.

5. The fabricating method according to claim 1, wherein the step of forming the ferroelectric liquid crystal layer includes the step of:
- forming a first ferroelectric liquid crystal layer on the upper substrate; and
- forming a second ferroelectric liquid crystal layer on the lower substrate.

6. The fabricating method according to claim 5, further comprising the step of aligning a spontaneous polarization direction of the first ferroelectric liquid crystal layer opposite to a spontaneous polarization direction of the second ferroelectric liquid crystal layer.

7. The fabricating method according to claim 1, further comprising the step of aligning a spontaneous polarization direction of the ferroelectric liquid crystal layer towards the substrate on which it is formed.

8. The fabricating method according to claim 1, further comprising the step of aligning a spontaneous polarization direction of the ferroelectric liquid crystal layer towards the nematic system liquid crystal layer.

* * * * *